Nov. 12, 1935.  M. B. HARRIS  2,020,606
VEHICLE PROTECTING LOCK
Filed Aug. 28, 1924   2 Sheets-Sheet 1

INVENTOR
Mark B. Harris
BY
Blackmore, Spencer & Fluit
ATTORNEYS

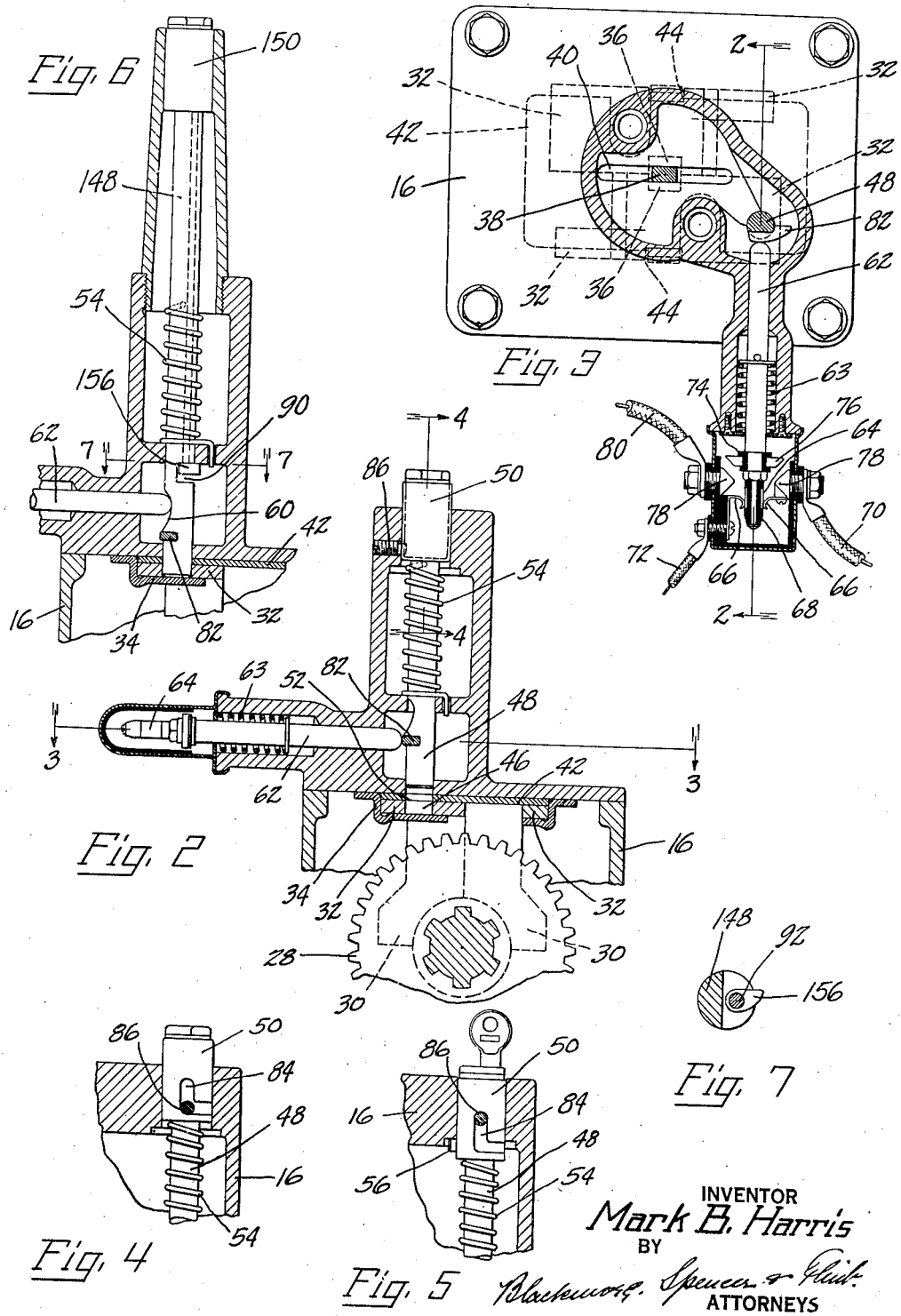

Patented Nov. 12, 1935

2,020,606

UNITED STATES PATENT OFFICE 2,020,606

VEHICLE-PROTECTING LOCK

Mark B. Harris, Detroit, Mich., assignor to General Motors Corporation, Detroit, Mich., a corporation of Delaware Application August 28, 1924, Serial No. 734,655

26 Claims. (Cl. 70—127)

This invention relates to automobiles, or similar vehicles, and is illustrated as embodied in an automobile chassis having ignition and starter switches controlled by theft-preventing lock, thus insuring that the car will be locked when left by the driver and also preventing the starting of the engine or the useless operation of the starter by unauthorized persons.

In one desirable arrangement, a part of the driving mechanism from the engine to the road wheels, for example the change-speed gearing of the usual transmission, is held positively in a position where the engine and road wheels are disconnected, by a lock which holds the switches open when the car is locked and which can be manipulated to close the ignition switch or both switches when the car is unlocked, the closing of the ignition switch preferably being effected automatically by unlocking the car. Ordinarily the lock is operated by a key, and when this is the case the starter switch may be closed by turning the key beyond the position in which the car is unlocked.

In the arrangements illustrated in the drawings, the lock controls the gear-shifting means of the transmission, and its release automatically closes the ignition circuit by wiping contacts or brushes which permit the driver to further operate the same switch-controlling member, e. g. by means of the key, to close the starter switch without opening the ignition circuit again.

Various novel and desirable particular constructions are useful when only one of the switches is controlled by the lock, although the full benefit of the invention is attained by using the lock to control both switches. These desirable constructions, which are defined more at length in the subcombination claims, and the advantages and objects of the invention generally, will be apparent from the following description of the illustrative embodiments of the invention shown in the accompanying drawings, in which:

Figure 2 is a section on the line 2—2 of Figure 3, vertically through the top of the transmission, showing the relation of the locking bolt and a switch-operating plunger;

Figure 3 is a section on the line 3—3 of Figure 2, horizontally through the top of the transmission, showing the switch construction;

Figure 4 is a vertical section on the line 4—4 of Figure 2, showing the lock in its upper or driving position;

Figure 5 is a vertical section at right angles to Figure 4, showing the lock in its lower or locked position;

Figure 6 is a vertical section, corresponding to Figure 2, but showing a modification; and Figure 7 is a section on the line 7—7 of Figure 6, showing the key-controlled catch which holds the locking bolt down against the resistance of its spring.

Figure 1:
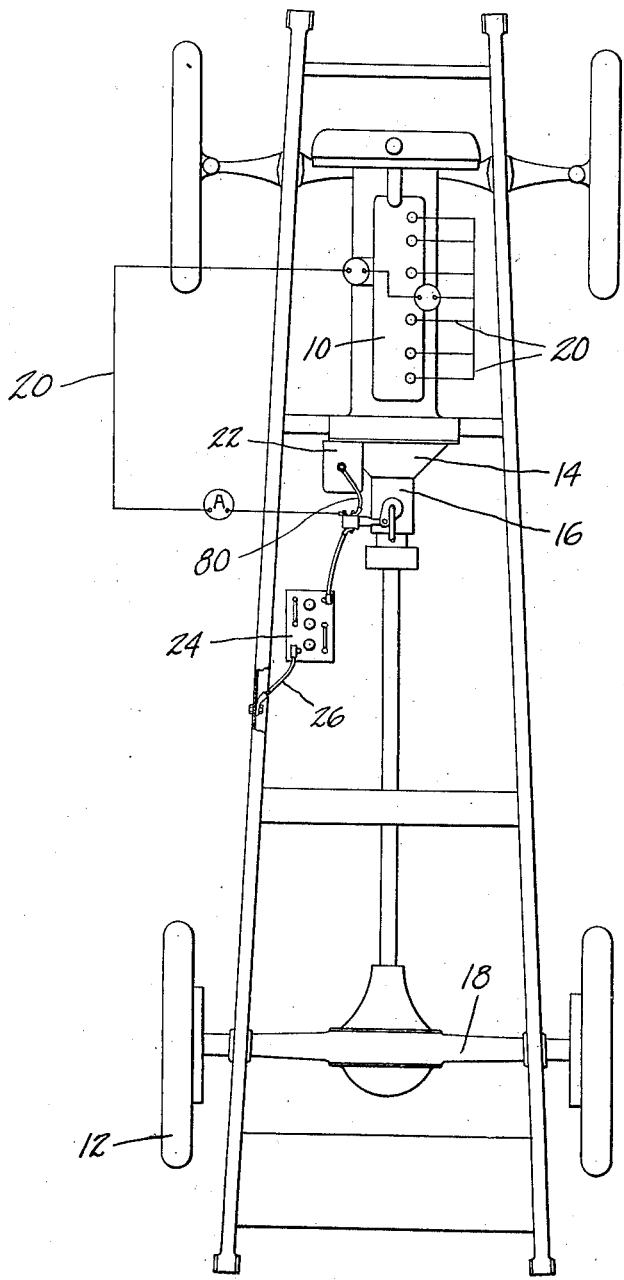
Figure 1 is a diagrammatic top plan view of the chassis of an automobile, showing the ignition and starter circuits.

In the arrangement of Figures 1-5, the invention is shown embodied in an automobile chassis including an engine 10 driving road wheels 12 through a clutch 14 and a selective transmission 16. The particular transmission shown is described in detail in Patent No. 1,823,432, issued Sept. 15, 1931. The transmission drives through the usual live axle 18. The engine has charge-igniting means 20, and an electrical starter 22, current being supplied by a battery 24 grounded to the frame by a connector 26.

As explained in detail in the above-identified application, the transmission 16 comprises change speed gearing 28 shifted selectively by shifter members having depending forks 30 engaging the gearing and upper plate-like portions 32 slidably supported on a stamping 34 secured to the bottom of the transmission cover. Portions 32 have operating notches 36, one or the other of which is engaged by a universally-mounted gear-shift lever 38. Lever 38 also extends through a long slot 40 in an interlocking plate 42, which is thus moved laterally but not forward and backward with the gear-shift lever, and which has depending interlocking fingers on opposite sides, one or the other of which engages one of two notches 44 in the outer edge of the idle shifter member. The portion 32 of one shifter member has a hole 46 (Figure 2) for an axially movable locking bolt 48, forming part of a key-controlled transmission lock with a lock barrel 50, and interlocking plate 42 also has a hole 52 for the bolt, the hole 52 being so placed as to register with the hole 46 when the plate 42 interlocks with the upper shifter member (Figure 3). Thus one shifter member is locked directly and the other one is locked through the interlocking plate.

The bolt 48 and barrel 50 are normally held in an upper idle position, as in Figures 2 and 4, by a spring 54, and are depressed to lock the transmission by the driver's foot, against the resistance of spring 54, until, as shown in Figure 5, a key-controlled latch 56 springs out and catches under the transmission cover. When key 58 is turned, latch 56 is swung back into the barrel 50, and spring 54 moves the locking bolt upwardly again. This being a well-known type of lock, detailed description is considered unnecessary.

Except as further described below, the foregoing parts may be of any desired construction.

As one very acceptable manner of securing the advantages of the present invention, bolt 48 is formed with a cam surface 60 along its side, in engagement with a switch-operating member such as a plunger 62 held against the cam surface by a spring 63. When the transmission is unlocked, as in Figure 2, the plunger engages a high point on the cam 60 and is forced outwardly (Figure 3) to bring a conducting collar 64 between two brushes or equivalent contacts 66. The collar 64 is carried by a bushing 68 of insulating material mounted on a reduced portion at the end of the plunger. One brush 66 is connected to a conductor 70 from the battery, while the other is connected to a conductor 72 leading to the charge-igniting means 20,—i. e. forming part of the ignition circuit. Thus the parts just described form the ignition switch. When the bolt is depressed to lock the transmission, plunger 62 rides onto a low part of the cam surface 50, urged by spring 63, thus withdrawing collar 64 from between brushes 66 and opening the ignition circuit. It will be seen, therefore, that the opening and closing of the ignition circuit are effected automatically by the locking and unlocking of the transmission.

Plunger 62 also carries a second insulating bushing 74 with a wedge-shaped conducting part 76 arranged, on further axial movement of the plunger, to bridge wedge-shaped contacts 78, one of which is connected to the battery by conductor 70, and the other of which is connected by a conductor 80 to the starter 22. Collar 64 is long enough so that this additional movement of the plunger does not reopen the ignition circuit, and part 76 serves as a stop to prevent further movement after the two circuits are closed. Contacts 78 and part 76 are, it will be seen, the starter switch.

This additional movement of the plunger is caused by an edge cam 82 on the locking bolt 48, at such a height that it is opposite the plunger when the transmission is unlocked, it being impossible for the starter switch to be closed when the transmission is locked. Bolt 48 is rocked to turn cam 82 by means of angular movement of key 58 beyond what is necessary to release the latch 56. The barrel 50 of the lock has a right-angle slot 84 embracing a pin 86, to prevent angular movement of the bolt until the lock is in its upper position,—i. e. until the transmission is unlocked and the ignition circuit is closed. Spring 54 is attached at one end to the bolt 48 and at its other end to a web of the transmission cover, to serve as a torsion spring resisting angular movement of the bolt 48 and cam 82, and to return the parts to the positions shown in Figure 2, with the starter switch open, as soon as the driver releases the key.

In the modification shown in Figures 6 and 7, bolt 148, which is longer than bolt 48 in Figure 2, is held down when the transmission is locked by a detent 156 in a notch 90 in the bolt, the detent being swung back and forth by a shaft 92 operated by the key-controlled mechanism in the barrel 150. Notch 90 is larger than is necessary to receive detent 156, so that if the top of the lock is sawed off by an automobile thief, detent 156 and shaft 92 will drop down far enough to bring shaft 92 below the level of the cut top of bolt 148, thus making it extremely difficult for the thief to turn the detent with a pair of pliers.

While illustrative embodiments of the invention have been described in detail, it is not my intention to limit its scope to those particular embodiments, or otherwise than by the terms of the appended claims.

I claim:

1. Transmission mechanism comprising, in combination, gear-shifting means, a theft-preventing locking mechanism therefor, said mechanism including a member movable to a plurality of different positions, an ignition switch opened and closed by movement of said member to and from one position, and a starter switch opened and closed by movement of said member to and from a different position.

2. Transmission mechanism comprising, in combination, lock-controlled gear-shifting means, an ignition switch, a starter switch, a member movable to a first position to close the ignition switch and to a second position to close both switches, and switch-controlling means operated by unlocking the gear-shifting means to move said member automatically to its first position, said switch-controlling means being further operable under the control of the driver to move said member to its second position.

3. Transmission mechanism comprising, in combination, an ignition switch, a starter switch, a member movable from an initial position in which both switches are open to a first position in which the ignition switch is closed and the starter switch is open and to a second position in which both switches are closed, gear-shifting means, and a lock for the gear-shifting means arranged to cause said member to move to its first position when the gear-shifting means is unlocked and to its initial position when the gear-shifting means is locked and which is further operable when the gear-shifting means is unlocked to move said member to its second position.

4. Transmission mechanism comprising, in combination, an ignition switch, a starter switch, a member movable to open and close said switches, gear-shifting means, a key-controlled lock for the gear-shifting means, a spring urging the switch-operating member to a position for opening the said switches, a device operated by unlocking the gear-shifting means to force said member against the resistance of its spring to close the ignition switch, and means operated by manipulating the lock by its key after the gear-shifting means is unlocked to close the starter switch.

5. Transmission mechanism comprising, in combination, a pair of brushes forming switch contacts, a pair of stops forming a second set of switch contacts, a plunger movable axially between the brushes and stops, a conducting part on the plunger in wiping engagement with the brushes when the plunger is moved from an initial position, an insulating part on the plunger in wiping engagement with the brushes when the plunger is in its initial position, a conducting shoulder on the plunger arranged to bridge the contacts formed by the stops and at the same time to limit the movement of the plunger, a spring urging the plunger toward its initial position, gear-shifting means, a lock for the gear-shifting means, and a device operated by manipulation of the lock to move the plunger axially against the resistance of its spring.

6. A device comprising, in combination, an axially movable locking bolt, a spring holding the bolt in an upper idle position, a key-controlled catch holding the bolt in a lower locking position, means to prevent angular movement of the bolt in its lower locking position and permitting it to be turned by its key when in the upper idle position, and an electrical switch opened and closed by angular movement of the bolt.

7. A device comprising, in combination, a pair of switches, a member movable from an initial idle position in which the switches are open to an intermediate active position in which one switch is closed and to a final active position in which the other switch is closed, a key-controlled axially and angularly movable locking bolt, a cam operated by axial movement of the bolt to move said member to one of its active positions, and a cam operated by angular movement of the bolt to move said member to its other active position.

8. In the combination as defined by claim 4, means associated with the lock adapted, upon release of the said key, to automatically return the lock to the position in which the starter circuit is open but the gear shifting means is unlocked and the ignition circuit is closed.

9. In an automobile, the combination with one of the controls thereof, of a locking device for said control, an electric controlling circuit associated with the automobile engine, a switch for controlling the circuit, means associated with said locking device and switch whereby movement of the locking device to locking position locks the said switch in open position and non-locking movement of the locking device when in unlocked position effects opening and closing of the switch and a positive lock carried by said locking device for locking the latter in adjusted position to prevent unauthorized movement.

10. In an automobile, the combination with one of the controls thereof, of a locking device for said control having a locking position and a plurality of unlocking positions, an electric circuit associated with the automobile engine, a switch for said circuit having an open position and a closed position, and means associated with said locking device and switch whereby operation of said locking device controls operation of said switch so that when said locking device is in locked position the switch is locked in one of said positions and in one of said unlocked positions the switch is in said first position and when the locking device is moved to the other unlocked position the switch is moved to its other position and a positive lock carried by said locking device for securing the lock against unauthorized movement, said lock constituting operating means for the locking device.

11. In an automobile, the combination with one of the controls thereof, of a lock for said control having a locking position and a plurality of unlocking positions, a plurality of electric circuits associated with said motor, switches for said circuits, and means associated with said lock and switches whereby the operation of said lock controls the operation of said switches so that both of said switches are held in open position when the lock is locked, one of said switches is moved into closed position when the lock is moved to one of the unlocked positions, and both switches are held in closed position when the lock is moved to another unlocked position.

12. In the combination as defined in claim 11, means for automatically returning said lock from the second named unlocked position to the first named unlocked position when the lock manipulating means is released with the lock in the second named position.

13. In an automobile, the combination of a transmission, a locking device for the transmission adapted to hold it in inoperative position, an electric circuit associated with the motor, a switch for controlling the circuit, means associated with the locking device and switch adapted to prevent operation of the switch when the locking device is locked but permitting opening and closing thereof when the lock is unlocked and the transmission is free for manipulation and a positive lock carried by said locking device for preventing unauthorized movement of the latter.

14. In an automobile, the combination of a transmission, a lock for said transmission having a locked position and a plurality of unlocked positions, an ignition circuit, a starter circuit, means associated with said lock and said circuits for effecting the opening of both of said circuits when the lock is locked, the closing of said ignition circuit only when the lock is moved to the first unlocked position and the closing of both of said circuits when the lock is moved to the second unlocked position.

15. In the combination as defined in claim 14, means for automatically returning the said lock to the first unlocked position when the lock manipulating means is released while the lock is in the second unlocked position.

16. In the combination as defined by claim 14, said lock comprising a reciprocating member provided with cam surfaces, and said means comprising a spring pressed circuit closing member adapted for engagement with said cam surfaces.

17. In the combination as defined in claim 14, said lock comprising a member mounted for reciprocating movement and for rotary movement and provided with a plurality of cam surfaces, one of which is effective upon reciprocating movement and the other upon rotary movement, and said means comprising a spring pressed circuit closing member operated by said cam surfaces.

18. In an automobile, the combination of a control member, a locking means therefore adapted to hold it against movement, a control switch, and means controlled by the locking means for preventing operation of the switch when the locking means is in locked position but permitting opening and closing of the switch when the locking means is in unlocked position and the control member is free for manipulation and a locking device arranged to lock said locking means against unauthorized movement, and to serve as an operating means for the locking means.

19. In the combination as defined in claim 9, said locking device comprising a reciprocating bolt for engaging said control.

20. In combination, a control member, an oscillatable and axially movable bolt for locking the control member, means for locking the bolt against both oscillation and axial movement when in locking engagement with said member, said bolt being axially movable to unlocking position in which it is capable of oscillation, and an electrical switch opened and closed by oscillation of the bolt when in said last-named position.

21. In an automobile, the combination with one of the controls thereof of a lock for said control, a plurality of electric circuits associated with the automobile engine, switches for said circuits, and means associated with said lock for controlling said switches, said means being adapted to hold the switches in open position when the lock is locked, and to close one switch and permit operation of the other switch when the lock is unlocked, said last-named means when in unlocked position being movable to operate the other switch.

22. A lock for locking a vital part of a motor vehicle and for simultaneously disabling a control circuit thereof, means for disabling the control circuit independently of actuating the lock, and means actuated by movement of the lock to locked position to prevent movement of the independent means.

23. In apparatus of the character disclosed the combination of coincidental lock mechanism for simultaneously locking the control mechanism and a control circuit of a motor vehicle, an independent control for the circuit freely operable in the unlocked condition of the lock mechanism, means operable in the locked condition of the lock mechanism to prevent such operation of the independent control and means operative to prevent injury to the parts should the lock mechanism be returned to locked position while said independent control is in its position for rendering the circuit operative.

24. A lock for locking a vital part of a motor vehicle and for simultaneously disabling a control circuit thereof, auxiliary means associated with the lock for disabling the circuit, means actuated by the lock for rendering the auxiliary means inoperative when the lock is in locked position and means to prevent injury to the parts should the lock be locked while the auxiliary means is in operative position.

25. In combination, coincidental lock mechanism for simultaneously locking the control mechanism and rendering a control circuit of a motor vehicle inoperative and including key actuated means for operating the same both ways, a manual control operable when the lock is in the unlocked condition to govern the circuit independently of said key actuation and means providing mechanical inter-connection between the manual control and lock mechanism to enable locking of both the steering and ignition solely by the key irrespective of the position in which the manual control is left.

26. In combination a coincidental lock for simultaneously locking the control apparatus and rendering a control circuit of a motor vehicle inoperative, said lock being operable in the reverse direction to simultaneously unlock the control apparatus and restore the control circuit to operative condition, a secondary control for the circuit independently operable to control the circuit when the lock is unlocked, means to secure said independent control against operation when the lock is locked and means enabling return of the lock to the locked position irrespective of the position of said independent control.

MARK B. HARRIS